(12) United States Patent
Raak et al.

(10) Patent No.: US 10,786,897 B2
(45) Date of Patent: Sep. 29, 2020

(54) ROBOT ARM

(71) Applicant: igus GmbH, Cologne (DE)

(72) Inventors: Martin Raak, Cologne (DE); Felix Berger, Cologne (DE)

(73) Assignee: IGUS GMBH, Cologne (DE)

( * ) Notice: Subject to any disclaimer, the term of this patent is extended or adjusted under 35 U.S.C. 154(b) by 86 days.

(21) Appl. No.: 16/082,460

(22) PCT Filed: Mar. 8, 2017

(86) PCT No.: PCT/EP2017/055494
§ 371 (c)(1),
(2) Date: Sep. 5, 2018

(87) PCT Pub. No.: WO2017/153500
PCT Pub. Date: Sep. 14, 2017

(65) Prior Publication Data
US 2019/0084149 A1    Mar. 21, 2019

(30) Foreign Application Priority Data
Mar. 8, 2016 (DE) .......................... 20 2016 101 255

(51) Int. Cl.
*B25J 17/00* (2006.01)
*B25J 17/02* (2006.01)
(Continued)

(52) U.S. Cl.
CPC .............. *B25J 9/042* (2013.01); *B25J 9/046* (2013.01); *B25J 9/08* (2013.01); *B25J 18/04* (2013.01); *B25J 18/02* (2013.01)

(58) Field of Classification Search
CPC ... B25J 9/08; B25J 18/025; B25J 9/046; B25J 9/042; B25J 9/04; B25J 9/02
See application file for complete search history.

(56) References Cited

U.S. PATENT DOCUMENTS

| 4,370,091 A | 1/1983 | Gagliardi |
| 8,240,971 B2 * | 8/2012 | Sandmeier ............... B25J 9/041 414/744.5 |

(Continued)

FOREIGN PATENT DOCUMENTS

| DE | 2742163 | 3/1979 |
| DE | 3026273 | 2/1981 |

(Continued)

OTHER PUBLICATIONS

English translation of International Search Report from corresponding PCT Appln. No. PCT/EP2017/055494, dated May 19, 2017.

(Continued)

*Primary Examiner* — Jake Cook
(74) *Attorney, Agent, or Firm* — Grossman, Tucker, Perreault & Pfleger, PLLC

(57) ABSTRACT

A robot arm comprising at least two arm joints which are pivotally connected together and which are driven directly. The aim of the invention is to reduce the energy required to move the parts when pivoting the arm joint and allow an uncomplicated adaptation of the robot arm to changed use conditions. This is achieved in that at least one of the two arm joints has a motor part and a joint part, wherein the two parts are arranged in a mutually spaced manner via a spacer part, and the other arm joint is arranged so as to engage with the spacer part of the arm joint such that the position can be changed relative to the arm joint.

19 Claims, 9 Drawing Sheets

(51) Int. Cl.
*B25J 18/00* (2006.01)
*B25J 9/04* (2006.01)
*B25J 9/08* (2006.01)
*B25J 18/04* (2006.01)
*B25J 18/02* (2006.01)

(56) References Cited

U.S. PATENT DOCUMENTS

| | | |
|---|---|---|
| 9,610,694 B2 * | 4/2017 | Duval .................... B25J 9/023 |
| 2005/0196263 A1 | 8/2005 | Tamura |
| 2017/0100844 A1 | 4/2017 | Raak et al. |

FOREIGN PATENT DOCUMENTS

| | | |
|---|---|---|
| DE | 3509803 | 9/1986 |
| DE | 102010013617 | 10/2011 |
| DE | 202014101342 | 5/2014 |
| DE | 102014014265 | 4/2015 |

OTHER PUBLICATIONS

English translation of International Preliminary Report on Patentability from corresponding PCT Appln. No. PCT/EP2017/055494, dated Sep. 11, 2018.

* cited by examiner

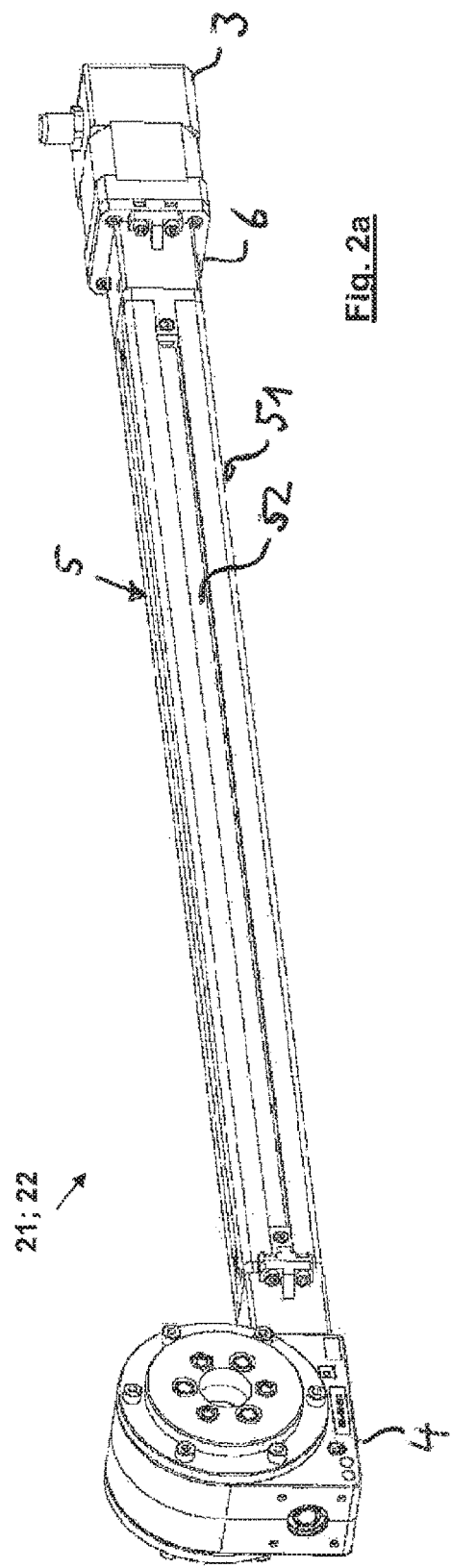
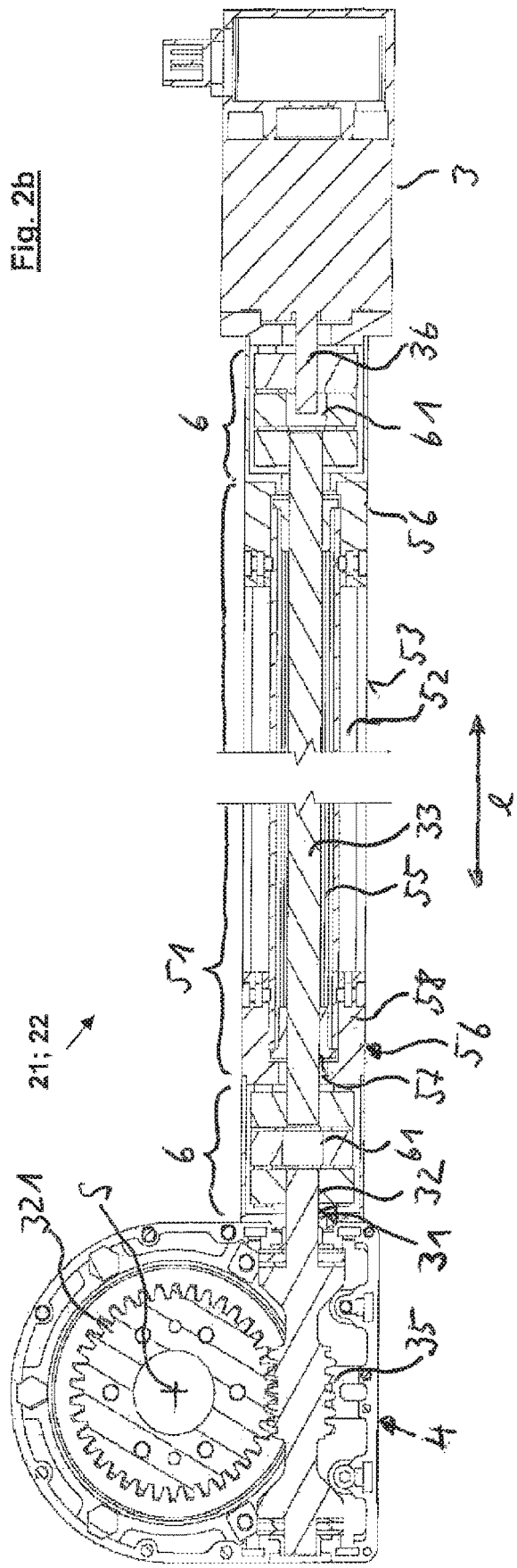
Fig. 2a
Fig. 2b

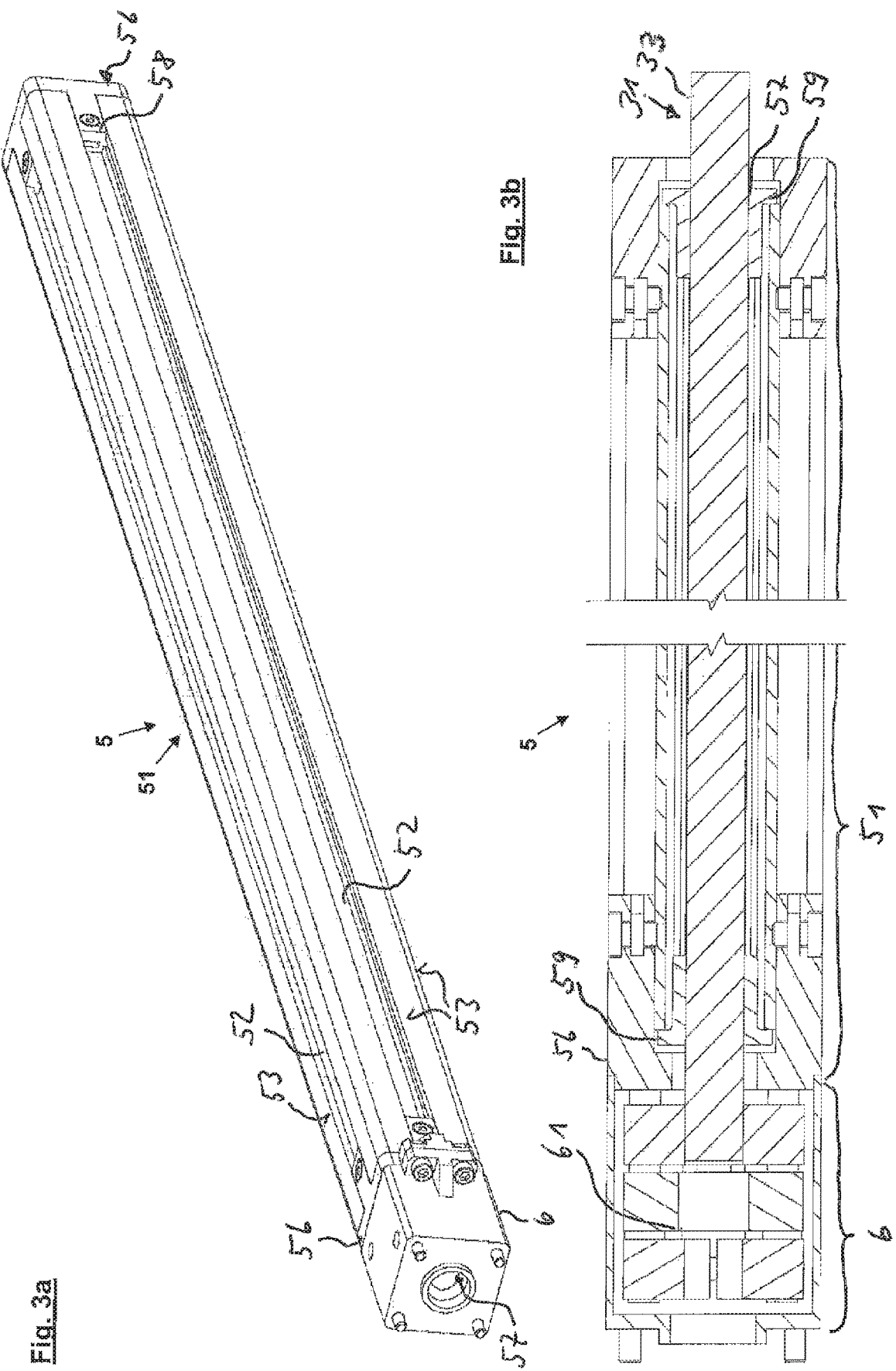

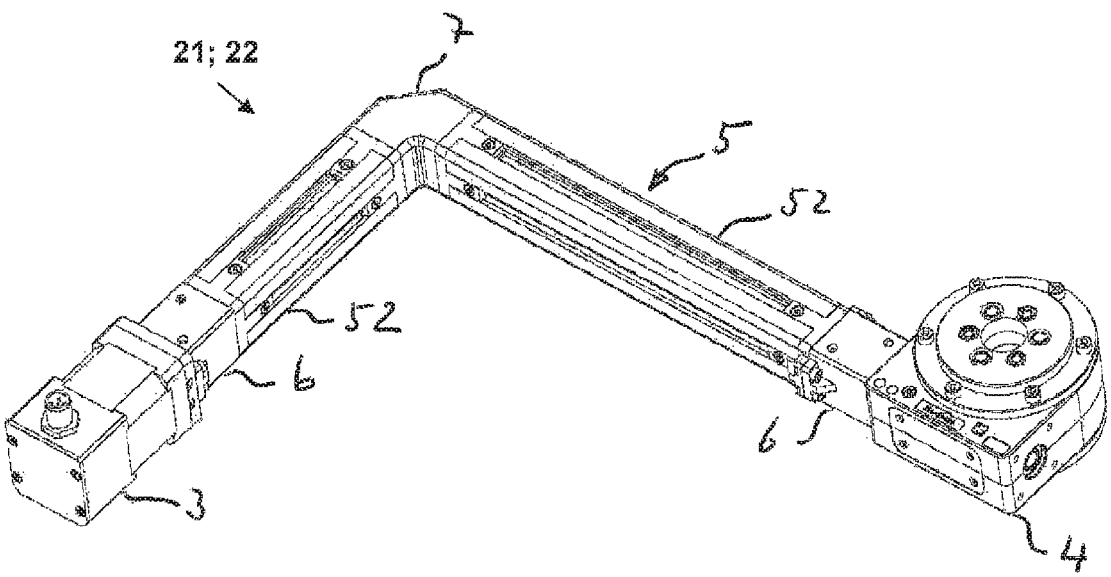
Fig. 5a
Fig. 5b
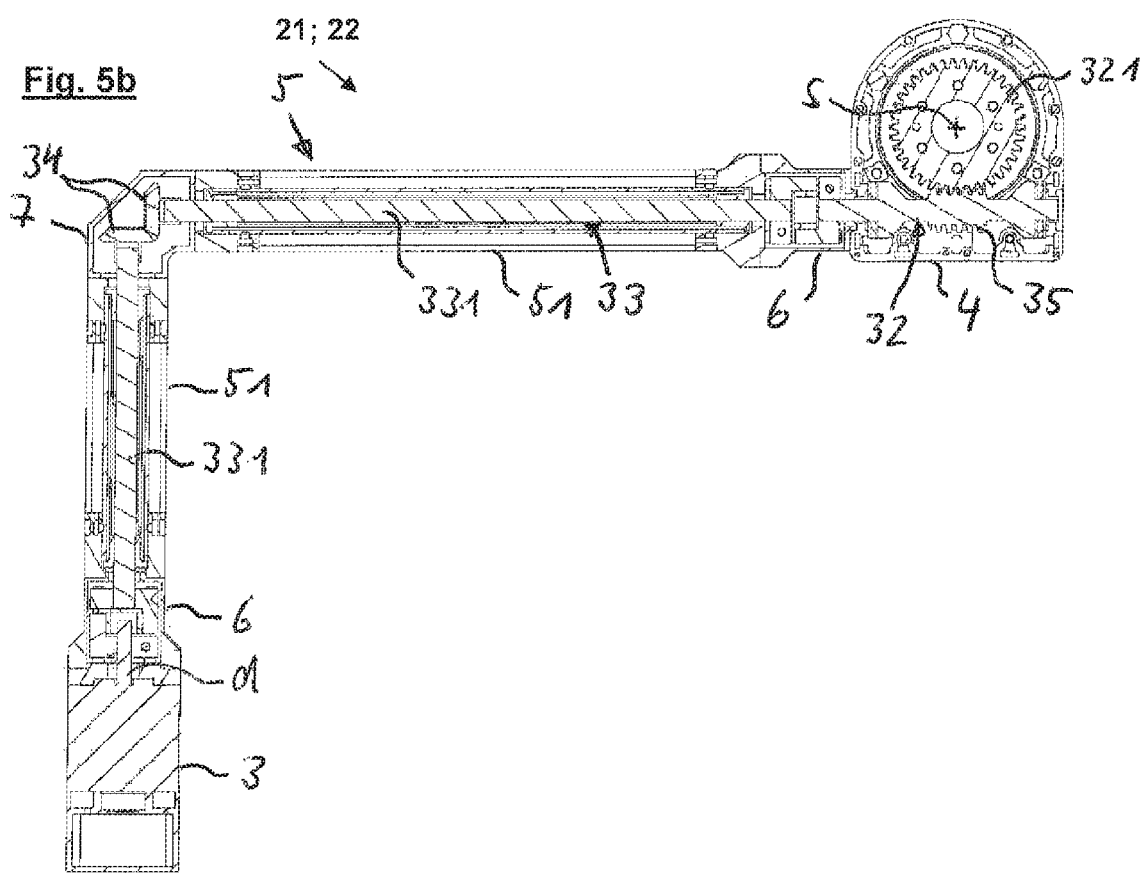

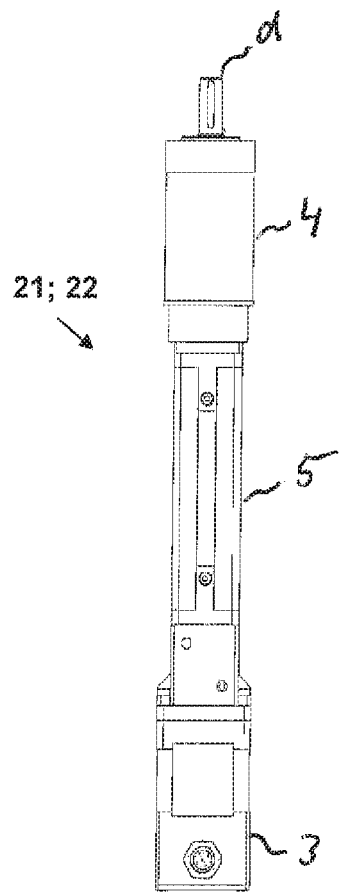
Fig. 6b
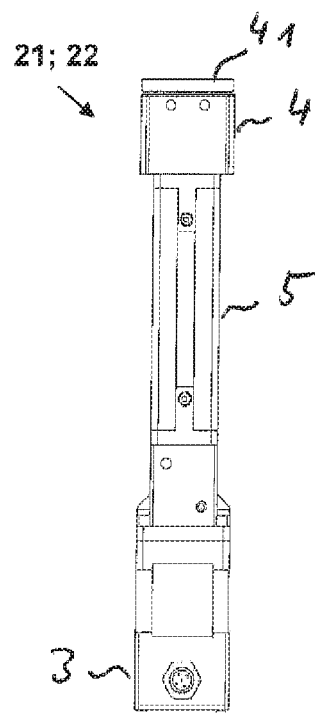
Fig. 7a
Fig. 7b
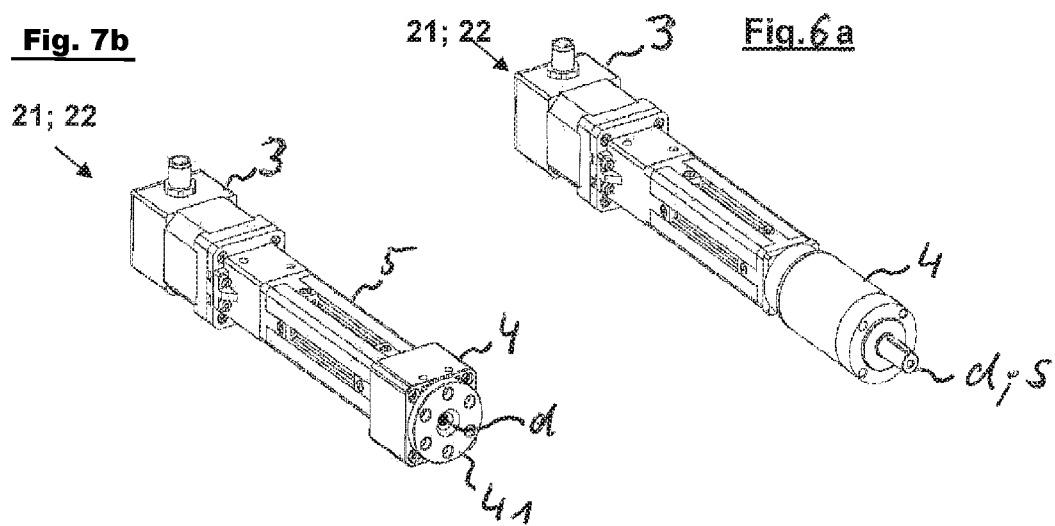
Fig. 6a

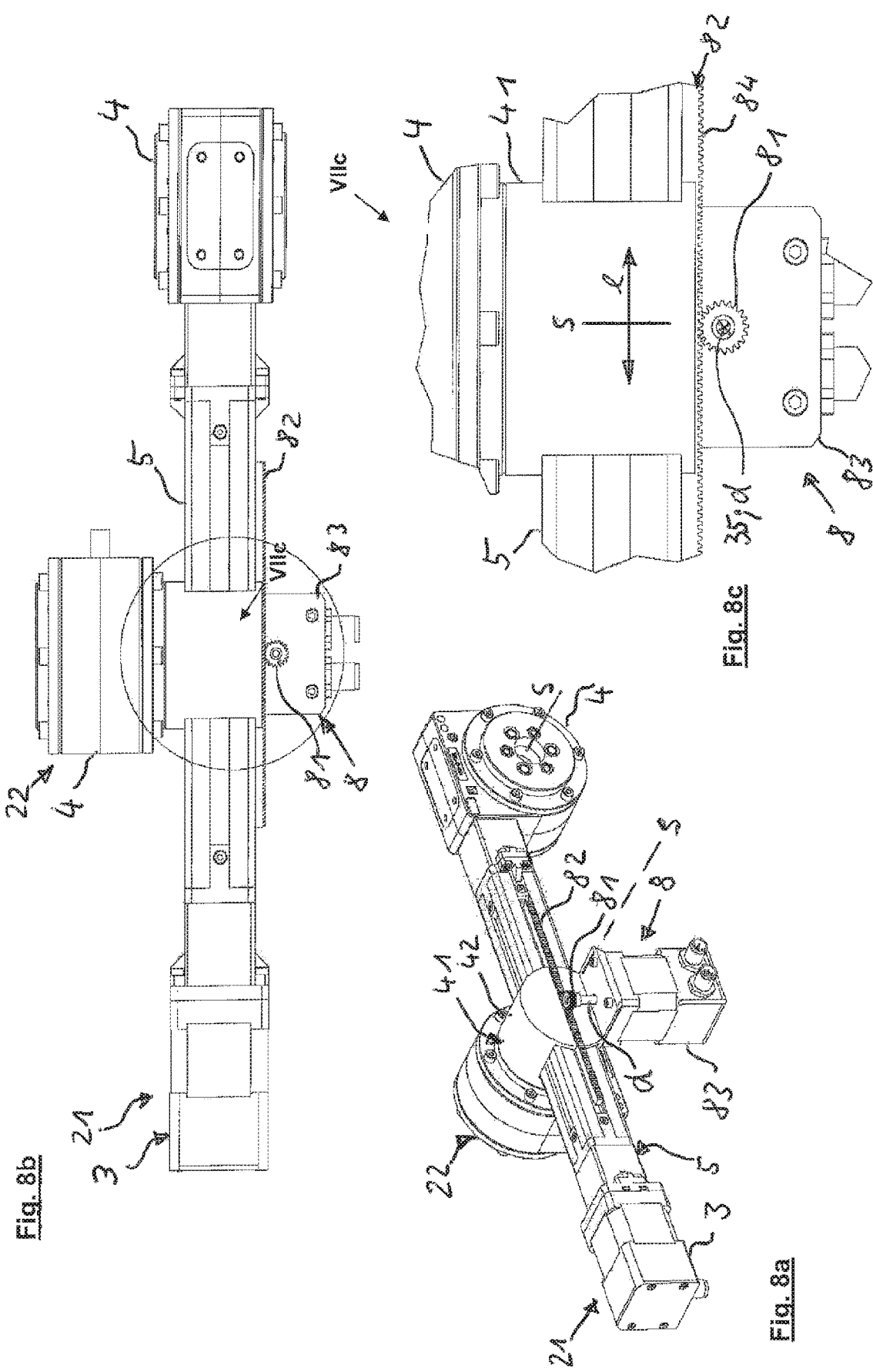

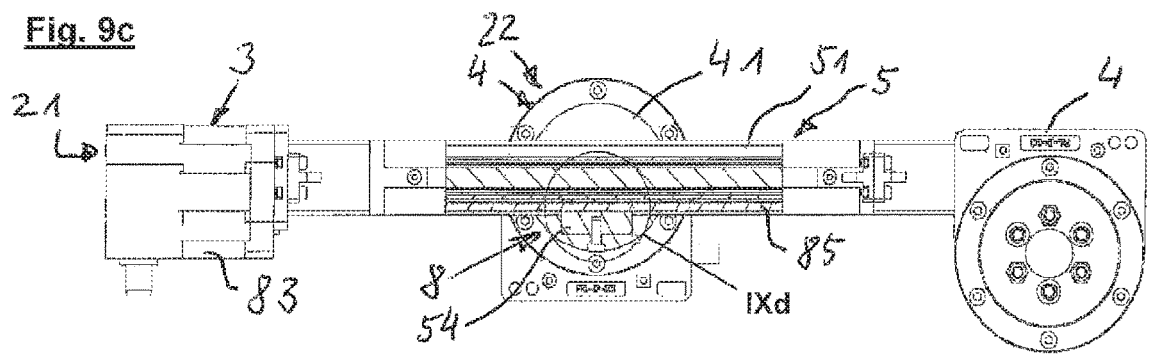
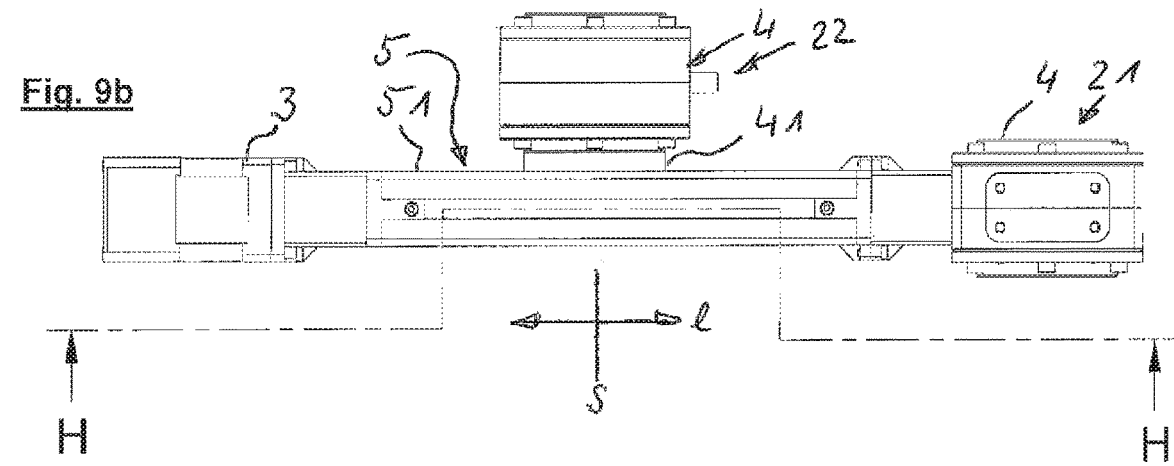
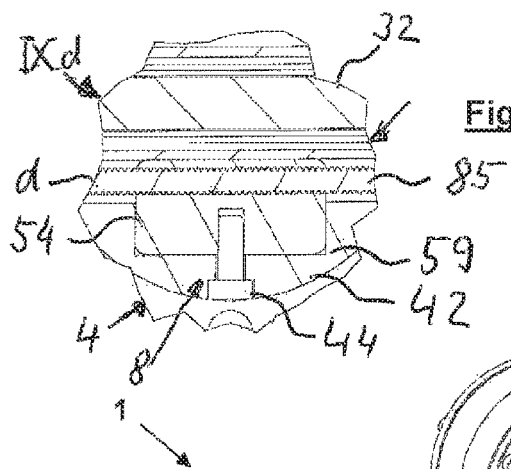
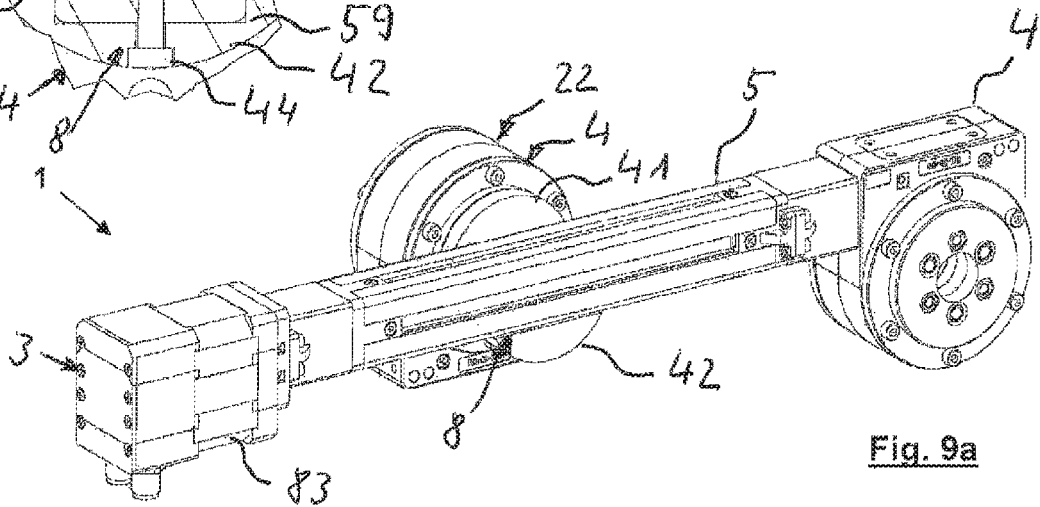

ROBOT ARM

FIELD

The invention concerns a robot arm comprising at least two directly driven arm joints which are pivotably connected together.

BACKGROUND

Such robot arms for an industrial robot having long been known. For example, in DE 20 2014 101 342 U and DE 10 2010 013 617 B4 a motor and a transmission are arranged in combined relationship, which however is disadvantageous upon pivotal movement of the arm joint in regard to the masses to be moved. In addition, robots are known in which the drives for the arm joints of a robot arm are arranged at the base of the robot and are connected in a complicated fashion to the respective joints to be moved by way for example of Bowden cables guided at the robot arm as force transmission means over fixed paths which are long corresponding to the spacing of the respective arm joint relative to the drive. That gives a fixed spacing relative to the joint which establishes the length of the force transmission means which does not allow adaptation to altered conditions of use of the robot without complicated and expensive modification operations.

SUMMARY

An object of the invention is to provide a robot arm of the general kind set forth for a robot, in which the energy expenditure for moving the parts in the pivotal movement of the arm joint is reduced. In addition, the invention seeks to provide for uncomplicated adaptation of the robot arm to altered conditions of use of the robot.

The specified object is already attained in that at least one of the two arm joints has a motor part and a joint part, wherein those two parts are arranged in mutually spaced relationship by way of a spacer part and the other arm joint is arranged to engage the spacer part of the one arm joint in a variable position relative to the one arm joint.

In the structure according to the invention the motor part and the joint part are not directly coupled. A spacer part is disposed between the motor part and the joint part. The motor torque can be transmitted from the motor part to the joint part by way of the spacer part. That arrangement further permits advantageous configurations of the robot arm, as described hereinafter. In particular a motor provided for the arm joint does not have to be moved in the pivotal movement of the arm joint, or is moved with a reduced level of force, thus saving on energy. In the position of installation, the other arm joint can be fixed variably in position to the one arm joint. In the position of installation, it can engage the spacer part of the one arm joint, in a variable position. The spacing of the engagement point at which the other arm joint engages the one arm joint, can be altered in relation to the motor part and the joint part. In that case the one arm joint can be arranged relative to the other arm joint in respect of a direction of succession from a base of the robot arm to the free end thereof, behind the other arm joint.

The robot arm can be adapted for example to altered conditions of use by way of the change in position of the other arm joint on the one arm joint. In that way the lever conditions of the two arm joints, the possible radii of pivotal movement of the two arm joints relative to each other and/or the ranges of the robot arm, that can be reached by way of the arm joints, can be adjusted. In the motor part, primarily an axial motor torque which at the drive output side is transmitted to the joint part by way of the spacer part, is converted in the joint part into a torque perpendicularly to the motor axis. The spacer part provides for spatial separation from the location of torque generation by the motor in the motor part to the location of torque conversion in the joint part. The two components of the arm joint, the motor part and the joint part, which are heavy because of the motor and the transmission and which thus involve greater inertia, are opposite each other in regard to the point of engagement of the other arm joint on the spacer part and by way thereof can advantageously be brought into equilibrium even in respect of the torques acting on the engagement point. In that way the energy consumption for moving the parts and thus for the pivotal movement of the one arm joint by the other arm joint can be reduced. In particular the movements of adjacent arm joints are independent of each other.

In an advantageously simple configuration it can be structurally provided that the variation in position occurs in or approximately in the longitudinal direction of the spacer part. The change in direction can be effected by way of a preferably linear movement between the motor part and the joint part. The variation in position can also be effected over an at least partially curved and/or angled path between the motor part and the joint part.

In a development of the robot arm the variation in position can be effected by displacement. The other arm joint can be displaceably arranged fixably on the spacer part of the one arm joint. The displacement can be effected in terms of a path of displacement in accordance with the above-described variation in position.

Displacement of the other arm joint at the one arm joint can be effected for example upon assembly or for adjustment of the robot arm, by the displacement being effected to a certain point and the other arm joint then being fixed to the one arm joint.

In an alternative configuration of the robot arm it can be provided that the other arm joint is arranged in motor-driven relationship in a variable position at the spacer part of the one arm joint. In that case the other arm joint can be fixed by way of the motor drive at any desired point or at selected points over the displacement path on the spacer part of the one arm joint.

In particular at least the two arm joints can have a motor part and a joint part, wherein those two parts are respectively arranged spaced from each other by way of the spacer part. The arm joints can each have a motor part and a joint part in the succession from the base of the robot arm towards the free end thereof, wherein they are arranged spaced from each other by way of the spacer part. In an advantageously simple configuration the other arm joint can be arranged to be displaceably fixed with its joint part in engaging relationship with the one arm joint laterally or at the end and more specifically laterally on the spacer part of the one arm joint. In that case the lateral or end engagement refers to the longitudinal extent of the respective arm joint or the direction of torque transmission from the motor part to the joint part. Lateral engagement of the joint part is advantageous for example in the case of a joint part with a worm transmission. In the case of the worm transmission the pivot axis can be arranged perpendicularly to the longitudinal extent of the other arm joint which engages the one arm joint. End engagement is advantageous for example in the case of a joint part with a usual transmission arrangement like a planetary transmission or a harmonic drive transmission, in which the pivot axis is respectively arranged in the longitudinal direction of extent of the other arm joint which engages the one arm joint. The term pivoting is also intended to mean rotation.

In an advantageously simple configuration the spacer part can be made up from a longitudinal profile portion. Devices described hereinafter can be simultaneously guided at or in that longitudinal profile portion, beside the other arm joint. In particular the longitudinal profile portion can be a standard longitudinal profile. The longitudinal profile portions of the individual arm joints of the robot arm can form a support structure for stabilizing same. The longitudinal profile portion can be conveniently cut to the desired length from a longitudinal profile member. The other arm joint can be longitudinally displaceably guided on and fixed on the longitudinal profile portion at a given point over the length thereof.

The longitudinal profile portion has a groove profile, into which the other arm joint engages in longitudinally displaceably guided relationship for example by way of an entrainment means guided in a longitudinal groove of the groove profile, like a sliding slot nut. The longitudinal profile portion can be made from an aluminum material or plastic.

Advantageously the joint part of the other arm joint can have a rotary disc for torque transmission. The joint part can engage the longitudinal profile portion for operative transmission of torque by way of the rotary disc. The rotary disc can have a protruding support portion, in particular a support projection, for lateral support on the longitudinal profile portion. The support projection can in turn have a contact surface which in the position of installation bears laterally against the longitudinal profile portion for slidingly displaceable contact of the other arm joint against the spacer part of the one arm joint. By way of that contact surface the rotary disc can be connected to the longitudinal profile portion in the position of installation in particular by at least one screw element thereof engaging into a female screw provided on the associated entrainment means or slot nut. The pivot axis of the other arm joint in the position of installation can be arranged perpendicularly to the longitudinal direction at least of the region of the spacer part, in which the other arm joint engages the spacer part.

The support projection can have a support profile with a contact side surface. That support profile can generally be adapted to the external profile of the longitudinal profile portion. The contact side surface can be adapted to the external profile of the longitudinal profile portion. The contact side surface can be of an L-shaped profile or a U-shaped profile in respect of a cross-section. It can form at least a portion, preferably completely, of the inside wall of a through opening provided for engagement of the longitudinal profile portion therethrough.

As a consequence of separation of the motor part from the joint part by the spacer part it is necessary for the motor force to be transmitted from the motor part to the joint part, for example in the form of a rotational torque. In an advantageous development of the robot arm there can be force transmission means like a belt, in particular a toothed belt, or a torque transmission shaft like a cylindrical shaft, a worm shaft or a spindle, for transmission of the motor force from the motor part to the joint part. The force transmission means can be arranged guided in and/or at the spacer part.

In that arrangement the force transmission means can be arranged externally for example in an outwardly open groove. It is considered more advantageous however for the spacer part to have at least one guide passage connecting the motor part and the joint part for receiving the force transmission means between the motor part and the joint part and/or lines which are provided, like control and/or supply lines. In that way those components are arranged combined together and guided in protected relationship. Force transmission means and lines can be respectively arranged separately in a guide passage. The two guide passages can be laterally completely separated from each other.

In addition, the guide passage can extend into the motor part and/or the joint part.

In a development the spacer part can have at least two mutually adjoining longitudinal profile portions. In that case the longitudinal axes of the two longitudinal profile portions can include an angle of less than 180°. Connected at least to one of those longitudinal profile portions is another arm joint which is guided laterally displaceably and fixably. Another arm joint can be connected to each of the longitudinal profile portions.

The two longitudinal profile portions can be connected together by way of an angle part. The angle part can have the guide passage for the force transmission means and lines. That can make the transition in aligned relationship into the guide passage of the respective longitudinal profile portion connected to the angle part. The angle part can have direction-changing means for changing the direction of the force transmission means and lines in the guide passage. Implementation of the change in direction of the force transmission means in the angle part can be effected for example by way of bevel gears in the case of a shaft transmission or by way of direction-changing rollers in the case of a belt transmission.

For each longitudinal profile portion another arm joint can engage same. The here two other arm joint can in this case of the same structure or size and/or of the same structure, but they may also differ in structure and/or size.

For connecting the motor part and/or the joint part respectively to the spacer part, in such a way to provide for effective transmission of the motor force, a respective coupling part can be provided between the motor part and the spacer part and/or between the joint part and the spacer part. In a structurally simple fashion and in a way facilitating assembly, that coupling part can be in the form of a claw or dog coupling. The guide passage can preferably connect to that in the spacer part in aligned relationship in that coupling part. The guide passage can also connect to the guide passage in the motor part and/or to that of the joint part in aligned relationship.

A fixing element, in particular a fixing cap, can be provided in the coupling part, by means of which the coupling part is arranged fixed to the longitudinal profile portion in the position of installation. In addition, the torque transmission shaft can be mounted rotatably in the coupling part. For that purpose, a sliding bearing sleeve can be provided in the fixing part, in which the torque transmission shaft is guidedly mounted. That sleeve can be of a lubricant-free nature.

In the above-described alternative embodiment of the robot arm with motor-driven positional variability of the other arm joint on the spacer part of the one arm joint other arm joints can also be arranged guided on the spacer part. The motor drive for that purpose can be arranged at one of the two arm joints.

In particular it can be provided that the motor drive is in the form of a linear drive. That has the advantage that both forms of movement, that is to say the relative pivotal movement of the one arm joint relative to a base or relative to an arm joint adjoining the base, and the linear relative movement of the other arm joint on the one arm joint, can be effected independently of each other, that is to say also at the same time.

The above-described linear drive can act from the other arm joint 22 by way of pinion 81 and rack on the longitudinal profile portion of the one arm joint which causes the longitudinal displacement of the other arm joint. In another embodiment of the robot arm the linear drive can act from the one arm joint directly on the spacer part 5 of that arm joint. The linear drive can have a rotary part and a linear part. It can have a usual motor drive associated therewith, with for example a worm gear and a rotary spindle as the rotary part.

In an embodiment of the robot arm the linear drive can act with coupling of a linear movement from the one arm joint to the spacer part of that arm joint.

For that purpose, the above-mentioned entrainment means can serve as a thrust member or linear member. The rotary spindle can be driven by means of a motor drive arranged in the motor part. The rotary spindle can extend through the longitudinal groove of the groove profile towards the entrainment means and engage axially through same, with thread engagement. For that purpose, the entrainment means can have a female thread and can be mounted displaceably and non-rotatably in the longitudinal groove. The entrainment means and the longitudinal groove can usually be of such a configuration that displacement takes place with as little friction as possible.

Alternatively, it can be provided that the motor part of the one arm joint also provides for the linear relative movement of the other arm joint at the one arm joint. For that purpose, it is possible for example to interpose a change transmission, by way of which the motor force can be transmitted selectively to the joint part of the one arm joint or to the other arm joint for the linear relative movement thereof, at the spacer part. In that case switching of the change transmission can preferably be effected electromagnetically.

In another configuration of the robot arm the linear drive can act from the other arm joint by way of a pinion as the rotary part and a rack as the linear part on the longitudinal profile portion to provide for longitudinal displacement of the other arm joint. In particular the motor drive of the linear drive can be arranged at the other arm joint and here in particular at the joint part thereof. The rotary motor shaft can act in that case at the drive output side on the pinion as the rotary part which in the position of installation engages meshingly with a rack as the linear part. The pinion can be arranged at the joint part of the other arm joint rotatably about an axis of rotation perpendicularly to the pivot axis, while the rack is fixed on the longitudinal profile portion oriented in the longitudinal direction thereof. The pinion can be arranged directly on the motor shaft.

Preferably the linear drive can be retro-fitted. That can be effected in a particularly simple manner with the last-described embodiment of the linear drive.

Fixing of the other joint part to the one joint part can be effected in a simple fashion by stoppage of the linear drive. In addition, braking and/or blocking means can be provided for fixing the position.

In addition, a particular advantage is seen in the fact that the arm joint is of a modular structure. The modular structure permits generally simplification in terms of assembly and rapid uncomplicated modification and/or repair. In addition, the modules can be easily stored in various sizes and shapes and fed to the assembly procedure in specifically targeted fashion.

In particular it can be provided that the modules are combined together in a modular construction system which, besides the configuration already described, permits still further variations in the embodiments of the robot arm. By virtue of its clarity that sequential arrangement of the modules in the modular construction system also has the advantage that the risk of errors in assembly can be substantially avoided so that even for less skilled assembly operators, it is possible to assemble and mount a robot arm correctly.

In principle all parts which have already been described like the motor part, the spacer part, the joint part, the longitudinal profile portion, the coupling part, the angle part, the force transmission means and the linear drive can be of a modular system and thus part of the modular construction system. Part of the modular construction system can also be transition modules, by which one component size is converted into another. In particular the components which are arranged in succession with each other in the position of installation like the motor part, the spacer part, the joint part, the longitudinal profile portion, the coupling part and the angle part can be respectively connected together by way of a push-in, push-in/latching and/or push-in/screw connection. As an alternative for attaining the object of the invention it is possible to provide an assembly set for producing a robot arm according to one of the embodiments described hereinbefore and hereinafter, in which case the assembly set has the modules necessary for producing a robot arm with a given number of identical-structure modules and/or non-identical-structure modules. In particular the spacer modules can be provided in different lengths in the assembly set.

In an alternative configuration for attaining the object of the invention there can be provided a robot having a robot arm in accordance with the embodiments described hereinbefore and hereinafter. The robot arm can be at least partially built up from a total of arm joints according to the invention, which are arranged predominantly in succession with respect to a succession of movement or a sequential direction from the base to the free end of the robot arm. In particular, in the case of a robot arm, counting from the base to the free end of the robot arm, the arm joints according to the invention can be particularly advantageously used from the third axis of the robot arm in the case of an articulated arm robot and from the second axis of the robot arm in the case of an SCARA robot or horizontal articulated arm robot.

BRIEF DESCRIPTION OF THE DRAWINGS

The present invention is described in greater detail hereinafter by means of a number of embodiments illustrated in the drawing of the robot arm and the arm joints thereof, without however wishing to limit the invention thereto. In the drawing:

FIGS. 2a and 2b show a perspective side view and a side view respectively of an arm joint of the robot shown in FIG. 1 with motor part, joint part and spacer part;

FIGS. 3a and 3b show a perspective side view and a side view respectively of the spacer part of FIG. 2 with connected coupling part;

FIGS. 5a and 5b show a perspective side view and a side view respectively of a further embodiment of the arm joint with an angled configuration;

FIGS. 6a and 6b and FIGS. 7a and 7b respectively show a perspective side view and a side view of a further embodiment of the arm joint;

FIGS. 8a through 8c show a perspective side view and a side view respectively of a further embodiment of the arm joint with a further arm joint engaging same;

FIGS. 9a and 9c show a perspective side view and two side views, one with partial longitudinal section along section line H-H in FIG. 9b, of a further embodiment of the arm joint with a further arm joint engaging same;

FIG. 9d shows a view of the enlarged portion IXd in FIG. 9c; and

DETAILED DESCRIPTION

Figure 1B:
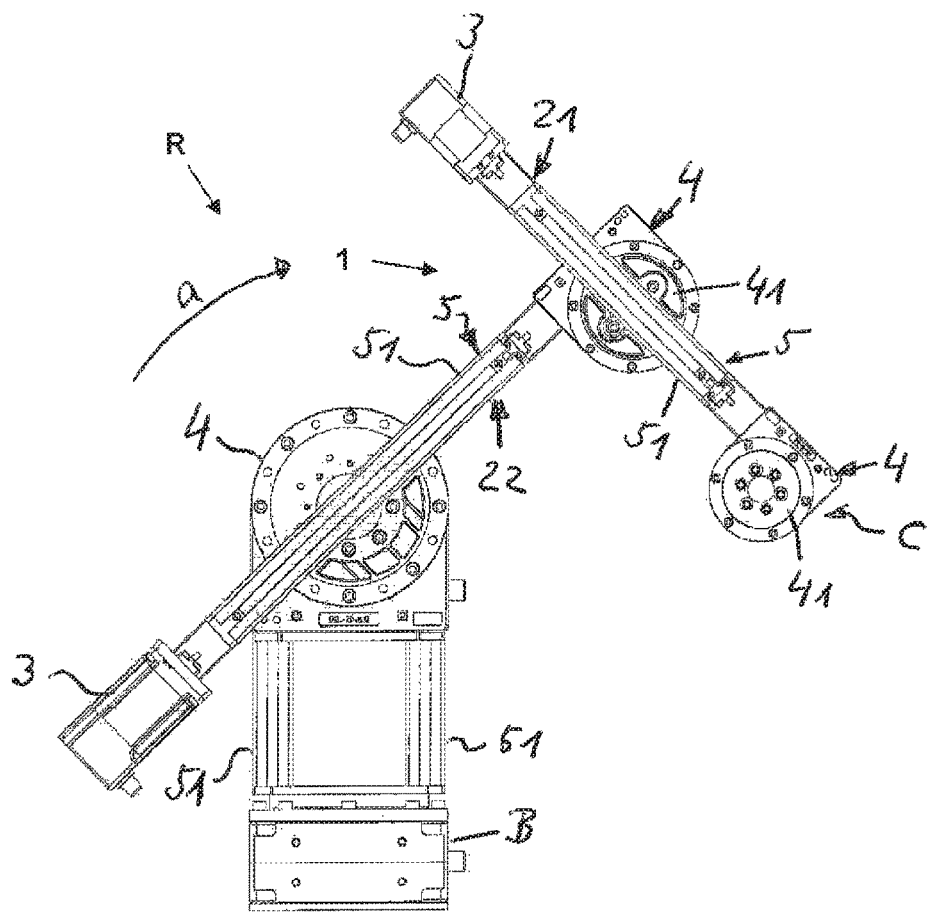
FIGS. 1a and 1b show a perspective side view and a side view respectively of a robot in the form of an articulated arm robot with a robot arm in a first embodiment.
Figure 1A:
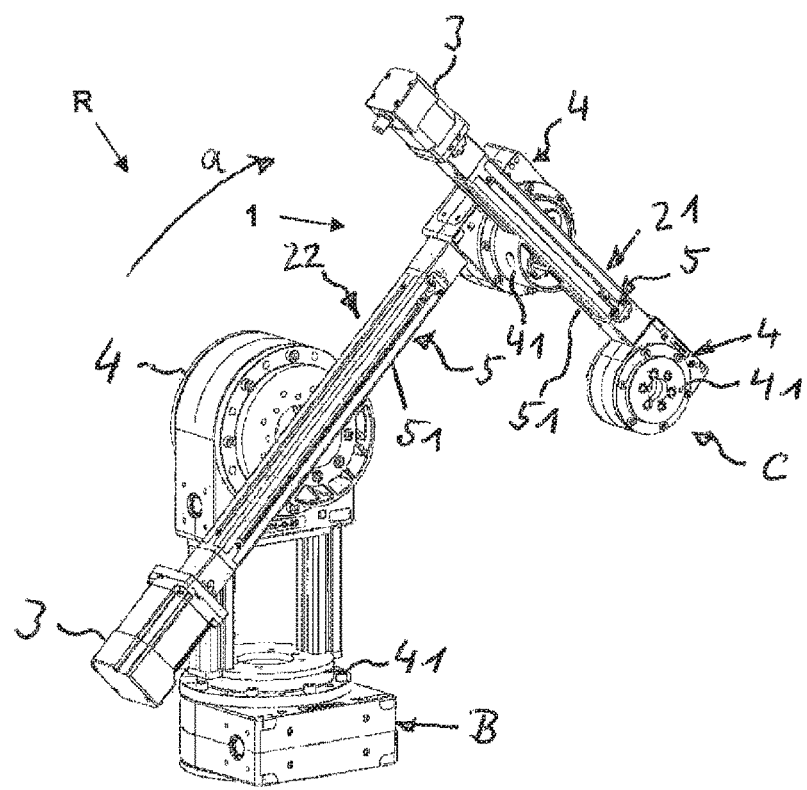

FIGS. 1 through 10 show various views and embodiments of a robot R with a robot arm 1 which has at least two pivotably interconnected, directly driven arm joints 21, 22, and individual views of various components and component groups of the robot arm 2. The two arm joints 21, 22 are arranged pivotably relative to each other about a pivot axis s. In FIG. 1 the robot R is in the form of a so-called articulated arm robot and in FIG. 10 it is in the form of a so-called SCARA robot. In that respect the coupling according to the invention of the arm joints 21, 22, counting from the base B towards the free end C of the robot arm, is applied in the case of the articulated arm robot from the third axis of the robot arm 1 while in the case of the SCARA robot it is applied from the second axis of the robot arm 1. In the description all terminology for describing location like up, down, front, rear, right and left are intended as being shown in the respective Figure itself, unless it is specifically defined differently.

In the embodiments illustrated here both arm joints 21, 22 have a motor part 3, a joint part 4 and a spacer part 5 spacing the two components 3, 4. It is provided that an arm joint 21 can be pivoted by the other arm joint 22. In this case the other arm joint 22 with its joint part 4 engages the spacer part 5 of the one arm joint 21 and is arranged in guided relationship thereon in a variable position, that is to say here in a reciprocating movement, and can be fixed thereto. In this arrangement the one arm joint 21 is arranged in relation to the other arm joint 22 in respect of a sequential direction a from a base B of the robot arm 1 towards the free end C thereof, behind the other arm joint 22. In particular the movement which is transmitted from the one arm joint 21 to the following arm joint is independent of the movement which is transmitted from the other arm joint 22 to the one arm joint 21.

The spacer part 5 has at least one longitudinal profile portion 51 which is engaged by the other arm joint 22 in this case longitudinally displaceably by way of its joint part 4, and is guided at same in the longitudinal direction 1. The longitudinal profile portion 51 is cut to length from a length profile member made here from plastic. As indicated in the two longitudinal profile portions 51 of FIGS. 2b and 3b by the centrally indicated interruption the longitudinal profile member can be of virtually any length in order for example to bridge over corresponding distances.

In general, the robot arm 1 is of a modular structure in which the motor part 3, the joint part 4 and the spacer part 5, in particular the longitudinal profile portion 51, and still further components described in greater detail hereinafter, are each in the form of a module, in which case they can be easily assembled and replaced.

The longitudinal profile portion 51 here is of a square cross-section and has a groove profile with a longitudinal groove 52 per side surface 53 of the longitudinal profile portion 51. In this case the other arm joint 22, depending for example on its desired position relative to the one arm joint 21, can engage guidedly by way of its joint part 4 selectively into one of the longitudinal grooves 52 by way of an entrainment means 54 guided displaceably in the longitudinal grooves 52, in the form of sliding slot nuts, at the longitudinal groove 52. This is clearly shown in FIG. 4, wherein for improved clarity, of the other arm joint 22 only its joint part 4 is shown here, with which it engages laterally in FIG. 4 and at its end in FIGS. 6 and 7 with its pivot axis s on the longitudinal profile portion 51. In both cases the pivot axis s is arranged radially relative to the longitudinal direction 1 of the longitudinal profile portion 51. In both cases engagement of the joint part 4 involves one of the elongate side surface 53 of the longitudinal profile portion 51. In the embodiment of the arm joint 21, 22 the joint part as shown in FIG. 6 has a usual planetary transmission and in that shown in FIG. 7 it has a usual harmonic drive transmission, in respect of which the axis of rotation d is arranged parallel to the longitudinal direction 1.

Figure 4A:
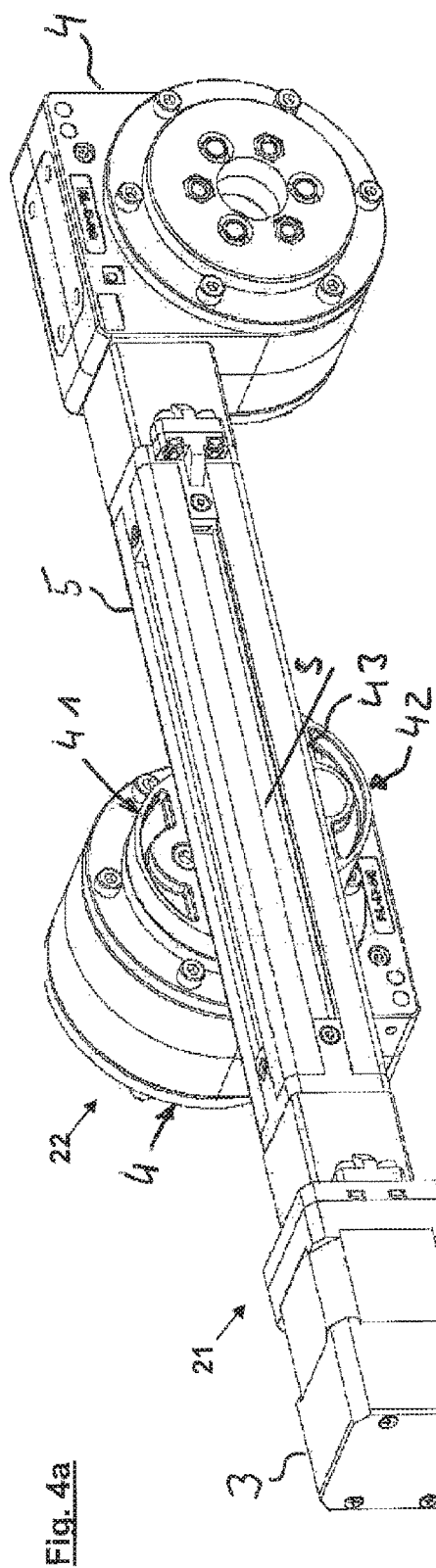
FIGS. 4a and 4b show a perspective side view and a side view respectively of the arm joint of the robot of FIG. 2 with a further arm joint engaging the spacer part.
Figure 4B:
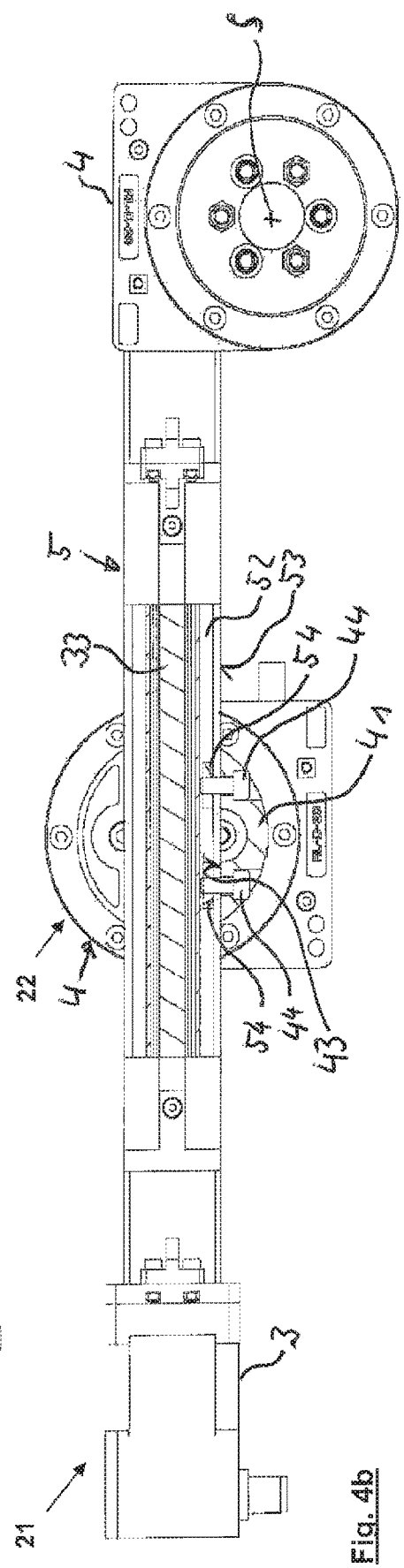

Referring to FIG. 4 provided as a prolongation of the pivot axis s is a rotary disc 41 for support and fixing at the one arm joint 21 laterally on the joint part 4 of the other arm joint 22. The rotary disc 41 extends with a support projection 42 of a profile which here is L-shaped, under the longitudinal profile portion 51. The profile of the support projection can generally be adapted to the external profile of the longitudinal profile portion 51. The support projection 42, corresponding to the L-shaped profile, has an upwardly facing and forwardly facing contact surface 43 for support in respect of the longitudinal profile portion 51. FIG. 4b shows a side view, the longitudinal profile portion 51 being shown in longitudinal section in the region of the longitudinal grooves 52. It can be clearly seen from FIG. 4b that in the embodiment of the robot arm shown here, there are two sliding slot nuts with a female thread as the entrainment means 54, into which a respective screw bolt 44 guided by the contact surface 43 engages and by way thereof forms a guide connection between the rotary disc 41 and the longitudinal profile portion 51. For fixing the other arm joint 52 to the spacer part 5 at a given location over the displacement path along the longitudinal grooves 52 the screw bolts 44 are only further tightened and braced against the bottom of the groove 52 whereby the respective sliding slot nut 54 is at the same time fixed at the inside in the longitudinal groove 52 in opposite relationship to the screwing direction. For that purpose, the longitudinal groove 52 in known manner has a T-shaped internal profile with undercut configurations at both sides.

As a consequence of the separation of the motor part 3 and the joint part 4 by the spacer part 5 fitted therebetween, transmission of the motor force is necessary from the motor part 3 to the joint part 4. For that purpose, force transmission means 31 are used in the embodiments shown here of the robot arm 1, in the form of a full-cylindrical torque transmission shaft 33 arranged guidedly in the spacer part 5. For that purpose, there is provided a guide passage 55 which is closed laterally and which connects the motor part 3 and the joint part 4 and through which the torque transmission shaft 33 is guidedly arranged. The guide passage 55 extends into the motor part 3 and into the joint part 4 respectively. All components 3, 4, 5 having the guide passage 55 are dust-tightly connected together at their ends. That means that the torque transmission shaft 33 is arranged completely protected from external influences.

Lines, which are additionally provided like control and/or supply lines can be arranged guided in that guide passage 55 or in a separate guide passage (not shown here).

An embodiment of the robot arm which is not shown here but which is immediately apparent is one in which at least the one arm joint has a curved spacer portion which in particular is curved in the manner of a portion of a circle, wherein force transmission is effected for example by means of a flexible torque transmission shaft.

As can be seen in particular from FIG. 3 provided at both ends of the longitudinal profile portion 51 are fixing caps 56 having a central through opening 57 for the torque transmission shaft 33. Those fixing caps 56 respectively engage with a projection 58 adapted to the groove profile for each longitudinal groove 52 with coverage of the longitudinal profile portion 51 into same, wherein at the same time they serve as a means for limiting the displacement path of the entrainment member 54 in the longitudinal grooves. The fixing caps 56 are fixed to the projections 58 in each case by means of a screw connection on the longitudinal profile portion 51. Provided within each of the fixing caps 56 is a respective sliding mounting sleeve 59 for mounting the torque transmission shaft 33. Structurally the fixing cap 56 is part of the coupling part 6. The fixing cap 56 in the position of installation fixes the coupling part 6 to the longitudinal profile portion 51.

As can be seen in particular from FIG. 4 in this embodiment of the robot arm 1 provided between the motor part 3 and the spacer part 5 and between the joint part 4 and the spacer part 5 is a respective coupling part 6 which in FIGS. 3b and 5b is respectively shown as a longitudinal sectional view together with the longitudinal profile portion 51. The worm shaft 32 and the torque transmission shaft 33 are coupled to each other in the coupling part 6. In this case by way of example coupling of the coupling part 6 is in the form of a usual claw or dog coupling 61. In addition, the arrangement of the fixing caps 56 with the sleeves 59 for mounting and guiding the torque transmission shaft 33 can be clearly seen from the views in longitudinal section.

In the joint part 4, the rotary moment transmitted from the torque transmission shaft 33 to the worm shaft 32 is transmitted to a worm gear 321, the axis of rotation is the same as the pivot axis s of the joint part 4.

FIG. 5 shows a further embodiment of the robot arm 1 with an arm joint 21, 22, in which the spacer part 5 is of an angled configuration which here is in a right-angled shape. In this case the spacer part 5 has two longitudinal profile portions 51 which are connected together by way of an angle part 7 which here is of a module-like configuration and which in turn is dust-tightly connected to the longitudinal profile portion 51. Because of the use of the lubricant-free sliding bearing sleeves in principle that is not necessary in regard to mounting the torque transmission shaft 33. It is however advantageous when using the robot arm for example in a clean room or in a moist atmosphere. To deflect the motor torque transmitted from the worm shaft 42 in the angle part 7, the torque transmission shaft 33 is divided into two portions 331 projecting into the angle part 7. The portions 331 are of a modular structure. They are each provided at the end with a bevel gear 34, in which case the two bevel gears 34 engage meshingly into each other in the position of installation.

It is not specifically shown but can be easily understood from the presentation in FIG. 5 that the arm joint 21, 22 in a further embodiment has two or more longitudinal profile portions 51, between which a respective joint part 4 is additionally disposed. The force transmission means 31 is arranged guided by all longitudinal profile portions 51 and joint parts 4 and at the same time drives all joint parts 4 inclusive of the joint part 4 provided at the end. For that purpose, the worm shaft 32 can have for example at the level of the respective joint part 4 a respective thread portion 35, as is shown in FIGS. 2b and 5b. It will be appreciated that this is also possible when using an interposed angle part 7 as described above.

FIG. 3a also shows an enlarged spacer module with a spacer part 5, fixing caps 56 and a coupling part 6, as can be used in a practical situation in assembly. In that case, corresponding to the desired structure of the robot arm, in a modular structure a motor part 3 or a joint part 4 can be fixed at the end of the spacer part with coupling part. In addition, a further longitudinal profile portion 51, an angle part 6 or a further coupling part 7 can be fixed at the free end of the longitudinal profile portion 51 in modular fashion. The coupling part 6 is fixed in flange-like manner by way of screw means.

Figure 10B:
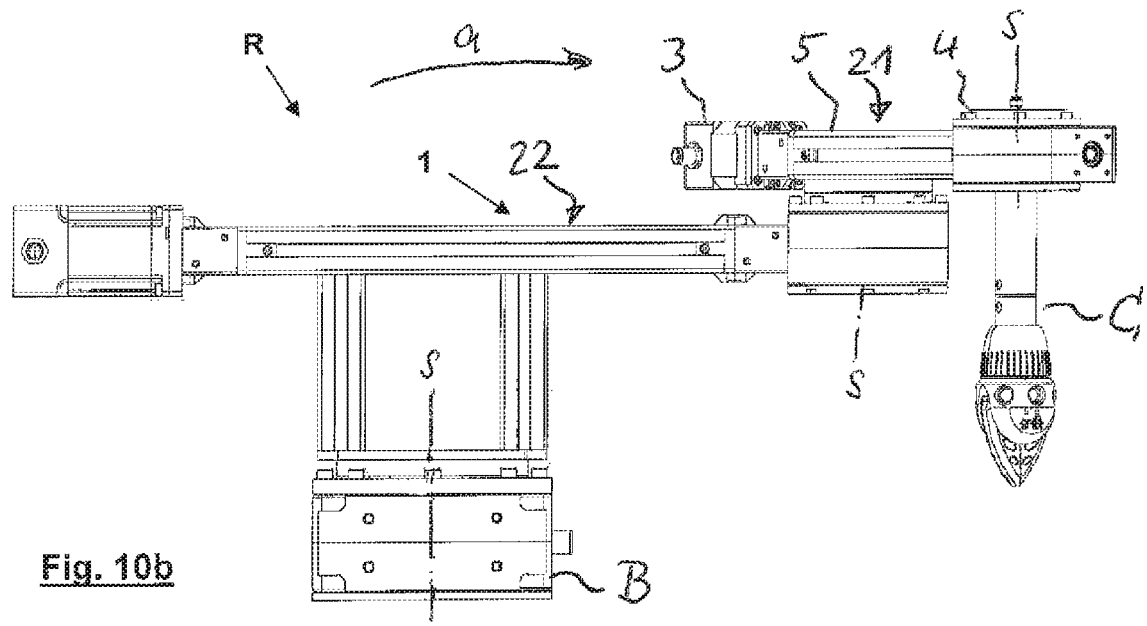
FIGS. 10a and 10b show a perspective side view and a side view respectively of a robot in the form of an SCARA robot with a robot arm according to the first embodiment.
Figure 10A:
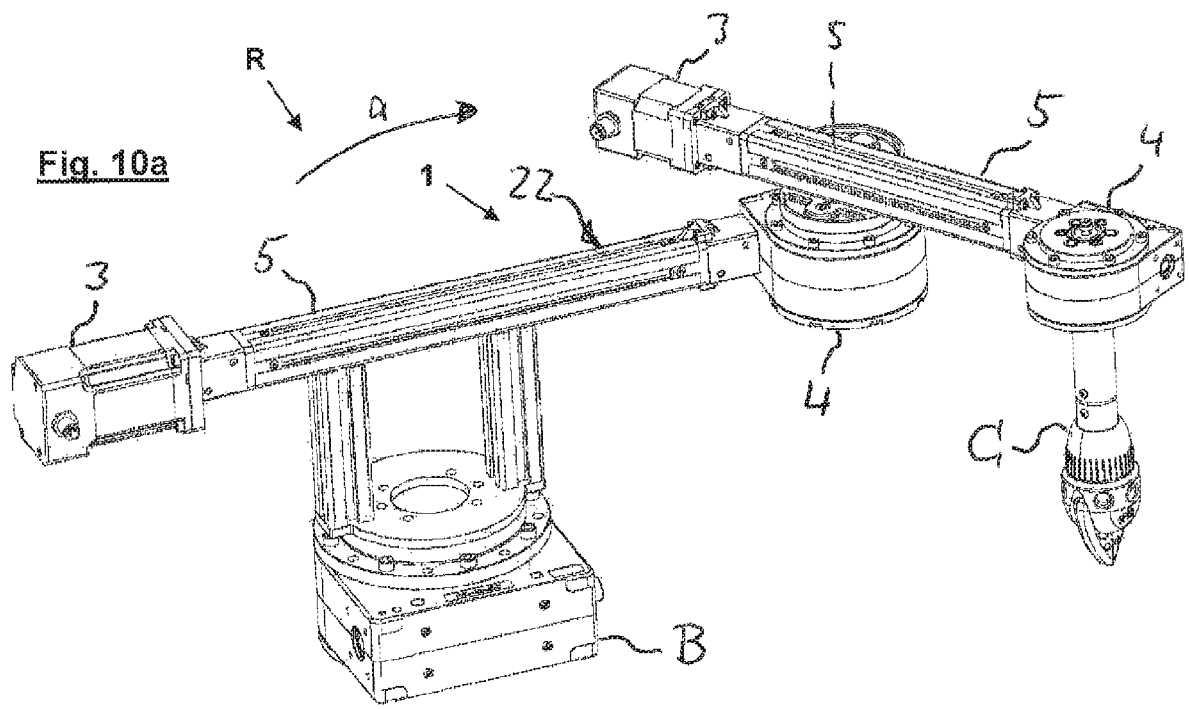

In the embodiments of the robot arm shown in FIGS. 1, 7 and 10, displacement of the other arm joint 22 on the longitudinal profile portion 51 of the one arm joint 21 is effected manually without a drive while displacement in the embodiments of the robot arm shown in FIGS. 7 and 9 is effected in motor-driven mode, here by means of a linear drive 8 which in principle is known per se from the point of view of its construction.

Turning to FIG. 8 the linear drive 8 is in the form of a module which is arranged at the level of the joint part 4 of the other arm joint 22 and opposite same with respect to the longitudinal profile portion 51. The linear drive 8 in itself corresponds in its structure to a usual linear drive here with a drive 83 which has a pinion 81 and the torque of which is transmitted by way of the pinion 81 to a linear rack 82. The axis of rotation d of the pinion 81 is oriented perpendicularly to the longitudinal direction 1 of the groove profile member, the pinion 81 being arranged non-rotatably on the motor shaft 35. The rack 82 is fixed in a given longitudinal groove 52 of the longitudinal profile portion 51. The rack 82 is arranged inserted laterally into the longitudinal groove 52 and is held non-displaceably in the longitudinal groove 52 at the end by the fixing caps 56. The pinion 81 meshingly engages the tooth arrangement 84 on the rack 82. For that purpose, the rack 82 projects outwardly with its tooth arrangement 84 beyond the longitudinal groove 52.

To simplify and stabilize the structure it is also provided that the rotary disc 41 connected to the joint part 4 of the other arm joint 22 embraces the longitudinal profile portion 51 on all sides. In addition, the linear drive 8 is also fixed to that rotary disc 41. In that respect the linear drive 8 can possibly form an assembly module with the rotary disc 41, but without the rack 82.

As the parts of the linear drive 8 with drive 83, including the pinion 81, and the rack 82, are merely mounted to components which are already present, namely the rotary disc 41 and the longitudinal profile portion 51 respectively, that form of the linear drive 8 can be retro-fitted and replaced in an uncomplicated fashion.

FIGS. 9a-9c show a further embodiment of the robot arm with another embodiment of the linear drive 8. In the case of the above-described linear drive 8 longitudinal displacement of the other arm joint 22 is implemented by same by way of the pinion 81 and the rack 82 on the longitudinal profile portion 51. In the embodiment hereinafter of the linear drive 8 as shown in FIG. 9 the linear drive 8 acts from the one arm joint 21 on the spacer part 5 of said one arm joint 21. In this embodiment the linear drive 8 has a rotary part, here in the form of a rotary spindle 85. Here, serving as the linear part is the entrainment member 54 which is guided non-rotatably and displaceably in a longitudinal groove 52 of the longitudinal profile portion 51, for guiding the second joint part 22 on the longitudinal profile portion 51. The motor torque is converted into a linear movement in the longitudinal direction 1 of the longitudinal profile portion 51 by way of the engagement of the rotary spindle 84 with its male thread into a female thread provided on the entrainment member, and the entrainment member 54.

In order to counter the risk of possible tipping or tilting of the entrainment member 54 in the longitudinal groove 52 the entrainment member 54 is of a longitudinal extent which is greater in comparison with the above-described sliding slot nut shown in FIG. 4b. As the enlarged view of FIG. 9d clearly shows the entrainment member 54 additionally projects at the underside beyond the longitudinal profile portion 51 and is fixed to the rotary disc 41 of the joint part 4 of the other arm joint 22 by means of a screw connection. For that purpose, the entrainment member 54 engages into a recess 45 provided on the rotary disc 41 in positively locking relationship in such a way that it bears non-rotatably therein. As a result, the entrainment member 54 is non-tippingly rotated directly with the rotation of the rotary disc together with the one arm joint in an advantageous fashion from the point of view of force mechanics. The ends of the entrainment member 54 are also of a rounded configuration.

As can be seen from the dimensions of the motor part 3, which are enlarged in comparison with FIG. 4b, the drive 83 is disposed in the motor part 3 of the one arm joint 21. The rotary spindle 85 extends out of the motor part 3 through the coupling part 6 into the longitudinal groove 52 in the longitudinal profile portion 51, passes through the entrainment member 54 with thread interengagement and further extends to the end of the longitudinal groove 52.

For assembly purposes the joint part 4 of the other arm joint 22 can be pushed with the entrainment member 54 into a central position on to the longitudinal profile portion 51. Then, in that position the rotary spindle 85 can be pushed into the longitudinal groove 52 and can be turned with further pushing movement into the longitudinal groove 52 into the entrainment member 54.

As can be seen directly from FIGS. 1 and 10 the pivot axes s in the case of the SCARA robot are arranged perpendicularly and those in the case of the articulated arm robot are arranged horizontally, except that for basic rotation on the base B. The proposed modular structure further makes it possible for the spacer part 5 to be here made up from two parallel longitudinal profile portions 51, whereby it is possible to achieve further stabilization of the robot arm 1.

LIST OF REFERENCES

1 robot arm
21 arm joint
22 arm joint
3 motor part
31 force transmission means
32 worm shaft
321 worm gear
33 moment transmission shaft
331 portion
34 bevel gear
35 thread portion
36 motor shaft
4 joint part
41 rotary disc
42 support projection
43 contact surface
44 screw bolt
45 recess
5 spacer part
51 longitudinal profile portion
52 longitudinal groove
53 side surfaces
54 entrainment member
55 guide passage
56 fixing cap
57 through opening
58 projection
59 sliding bearing sleeve
6 coupling part
61 claw coupling
7 angle part
8 linear drive
81 pinion
82 rack
83 drive
84 tooth arrangement
85 rotary spindle
B base
C free end
a sequential direction
d axis of rotation
l longitudinal direction
s pivot axis

What is claimed is:

1. A robot arm comprising:
at least two directly driven arm joints which are directly connected together pivotably,
wherein at least one of the two arm joints has a motor part, and a joint part, wherein the motor part and the joint part are arranged in a mutually spaced relationship by way of a spacer part and motor torque is transmitted from the motor part to the joint part by way of the spacer part along a longitudinal direction of the spacer part, and the other arm joint is arranged to engage the spacer part of the one arm joint in a variable position relative to the one arm joint.

2. The robot arm as set forth in claim 1, wherein the other arm joint is displaceably arranged fixably on the spacer part of the one arm joint.

3. The robot arm as set forth in claim 1, wherein the other arm joint is arranged displaceably in motor-driven mode fixably on the spacer part of the one arm joint.

4. The robot arm as set forth in claim 1, wherein the other arm joint with its joint part engages the spacer part laterally or laterally at the end thereof.

5. The robot arm as set forth in claim 1, wherein the spacer part has at least one longitudinal profile portion wherein the other arm joint is arranged engaging the longitudinal profile portion in longitudinally displaceable relationship.

6. The robot arm as set forth in claim 5, wherein the longitudinal profile portion has a groove profile into which the other arm joint engages in longitudinally displaceably guided relationship by an entrainment means guided in a longitudinal groove.

7. The robot arm as set forth in claim 5, wherein the joint part of the other arm joint has a pivot axis for pivotal movement of the one arm joint and that the pivot axis of the other arm joint is arranged in the position of installation perpendicularly to the longitudinal direction at least of the region of the longitudinal profile portion of the one arm joint.

8. The robot arm as set forth in claim 5, wherein the joint part of the other arm joint for torque transmission has a rotary disc, by way of which the joint part engages the longitudinal profile portion.

9. The robot arm as set forth in claim 8, wherein the rotary disc has a protruding support projection with a contact surface which in the position of installation bears laterally against the longitudinal profile portion and which in the position of installation is connected to the longitudinal profile portion.

10. The robot arm as set forth in claim 1, wherein force transmission means are provided for transmission of the motor force from the motor part to the joint part, wherein the force transmission means are arranged guided at the spacer part.

11. The robot arm as set forth in claim 10, wherein the spacer part has a guide passage connecting the motor part and the joint part for receiving the force transmission means between the motor part and the joint part and/or control lines and/or supply lines.

12. The robot arm as set forth in claim 4, wherein the spacer part has at least two longitudinal profile portions, the longitudinal axis of the two longitudinal profile portions include an angle of less than $180°$.

13. The robot arm as set forth in claim 12, wherein the two longitudinal profile portions are connected together by way of an angle part.

14. The robot arm as set forth in claim 1, wherein a coupling part is provided between the motor part and the spacer part and/or a coupling part is provided between the joint part and the spacer part.

15. The robot arm as set forth in claim 11, wherein the coupling part between the motor part and the spacer part and/or the coupling part between the joint part and the spacer part are part of the spacer part.

16. The robot arm as set forth in claim 3, wherein a linear drive with a rotary part and a linear part is provided for motor-driven displaceability of the other arm joint at the one arm joint.

17. The robot arm as set forth in claim 16, wherein the spacer part has at least one longitudinal profile portion wherein the other arm joint is arranged engaging the longitudinal profile portion in longitudinally displaceable relationship and the rotary part is in a form of a pinion and the linear part is in a form of a rack, wherein the pinion is arranged on the joint part of the other arm joint rotatably about an axis of rotation perpendicularly to the pivot axis and engages in the position of installation meshingly on the rack which is arranged fixed to the one joint part oriented in the longitudinal direction of the longitudinal profile portion of the one joint part.

18. The robot arm as set forth in claim 16, wherein the spacer part has at least one longitudinal profile portion wherein the other arm joint is arranged engaging the longitudinal profile portion in longitudinally displaceable relationship, the longitudinal profile portion has a groove profile into which the other arm joint engages in longitudinally displaceably guided relationship by way of an entrainment means guided in a longitudinal groove, and wherein the rotary part is in the form of a rotary spindle and the entrainment means serves as the linear part, wherein the rotary spindle is driven by means of a drive arranged in the motor part, extends through the associated longitudinal groove of the groove profile to the entrainment means and engages through same with thread engagement.

19. The robot arm as set forth in claim 1, wherein the arm joint is of a modular structure, wherein at least the motor part, the joint part and the spacer part are respectively in the form of a module.

* * * * *